United States Patent [19]

Yamaguchi et al.

[11] Patent Number: 4,917,708
[45] Date of Patent: Apr. 17, 1990

[54] DEBURRING AND CLEANING APPARATUS WITH MULTI-STATION ROTARY DRUM AND RECIPROCATING BLASTING GUNS

[75] Inventors: Tomio Yamaguchi; Shoichi Harada; Akira Suzuki; Ikuei Takamura, all of Shizuoka, Japan

[73] Assignee: Fuji Seiki Machine Works, Ltd., Shizuoka, Japan

[21] Appl. No.: 168,186

[22] Filed: Mar. 15, 1988

Related U.S. Application Data

[63] Continuation of Ser. No. 145,080, Jan. 19, 1988, abandoned.

[30] Foreign Application Priority Data

Jan. 19, 1987 [JP] Japan .................................. 62-008177
Jan. 19, 1987 [JP] Japan .................................. 62-8176
Mar. 26, 1987 [JP] Japan .................................. 62-070185

[51] Int. Cl.$^4$ ............................................. B24C 3/04
[52] U.S. Cl. ............................................ 51/419; 51/426; 51/413; 51/439
[58] Field of Search ................ 51/419, 413, 426, 410, 51/321, 439, 215 AR

[56] References Cited

U.S. PATENT DOCUMENTS

| | | | |
|---|---|---|---|
| 2,629,207 | 2/1953 | Gladfelter et al. | 51/419 |
| 4,355,490 | 10/1982 | Lepere et al. | 51/419 |
| 4,478,368 | 10/1984 | Yie | 51/439 |
| 4,577,441 | 3/1986 | Brenner | 51/419 |
| 4,753,051 | 6/1988 | Tano et al. | 51/426 |
| 4,760,673 | 8/1988 | Tsuchiya | 51/410 |

FOREIGN PATENT DOCUMENTS 30-8000 11/1955 Japan .

OTHER PUBLICATIONS

Hammond Autoshot photograph copies (5 Sheets).
Hommond Autoshot drawing (1 Sheet).
Wet blasting machine specification sheet (1 sheet) and drawing sheet (1 sheet).

*Primary Examiner*—Robert Rose
*Assistant Examiner*—Robert A. Rose
*Attorney, Agent, or Firm*—Flynn, Thiel, Boutell & Tanis

[57] ABSTRACT

A blasting apparatus for cleaning and deburring workpieces having a housing defining a blasting chamber therein. A rotary drum within the chamber is supported for rotation about a horizontal axis. A drive effects rotation of the drum through a plurality of angular steps during each revolution. The drum has a plurality of circumferentially spaced compartments opening radially outwardly thereof. A workpiece holder is positioned within each compartment. A housing opening cooperates with the drum, when stationary, to define a station for permitting loading and unloading of workpieces with respect to the holder associated with one compartment. A gun arrangement effects deburring and cleaning of workpieces mounted on the drum. The gun arrangement includes a plurality of nozzles mounted circumferentially so that each nozzle cooperates with a selected compartment and moves axially therealong for treating the workpiece.

15 Claims, 7 Drawing Sheets

DEBURRING AND CLEANING APPARATUS WITH MULTI-STATION ROTARY DRUM AND RECIPROCATING BLASTING GUNS

CROSS REFERENCE TO RELATED APPLICATION

This application is a continuation-in-part of copending application Ser. No. 145080 filed Jan. 29, 1988, now abandoned.

FIELD OF THE INVENTION

This invention relates to an apparatus for deburring and cleaning of an article, such as an electronic device encapsulated by plastic material, by blasting an abrasive slurry against the article. This apparatus relates to an improvement wherein a multi-compartment drum is rotatable in a step-like manner about a substantially horizontal axis for permitting sequential treating steps to be carried out, and additionally relates to an improvement in the nozzle structure utilized for blasting the slurry against the article.

BACKGROUND OF THE INVENTION

It is known that an electronic device encapsulated by plastic on a lead frame has flash which is formed on the lead parts when the device is encapsulated during the molding process. To remove this flash, the lead frame is typically cleaned by either dry or wet blasting processes, with the blasting media (whether wet or dry) typically involving some type of abrasive particle.

An example of a deburring and cleaning apparatus for plastic-packaged electronic devices is disclosed in Japanese provisional patent Publication SHO-60-36155. This apparatus involves a first pair of belt conveyors which clamp in cantilever style one side of the lead frame as it extends in a lengthwise direction so that a first blasting nozzle can blast the non-clamped side of the lead frame, and a second pair of conveyor belts also clamp in cantilever style the other side of the lead frame so that a second nozzle can blast the other side of the lead frame.

Another example of a deburring and cleaning apparatus for an electronic device encapsulated by plastics, such as a lead frame arrangement, is disclosed in Japanese patent Publication SHO-59-10578. This latter apparatus has a pair of endless belts having reaches running in parallel and having clamping devices thereon for holding the sides of a lead frame therebetween so that the lead frame is transported through a blasting chamber having blasting and washing nozzles therein for treating the lead frame.

While the apparatus disclosed in the publications mentioned above have been utilized to effect burr removal and cleaning of plastic-encapsulated electronic devices, nevertheless it has been observed that such apparatus experience undesirable failures and operational limitations. For example, failures due to jamming or falling of the lead frame (i.e. workpiece) have been observed. Further, portions of the lead frame where no deburring is necessary are also blasted and, due to the fact that the conveyor arrangements generally only loosely hold the workpiece, this can cause undesired roughening and marring of the workpiece package. Further, with apparatus of the aforementioned type, particularly those using belt conveyor systems, the overall apparatus requires substantial length and width which, when coupled with all of the required treatment steps such as washing, rinsing, air blowing and drying, results in a linear arrangement which occupies an undesirably large space.

Accordingly, the present invention relates to a deburring and cleaning apparatus which is believed to represent a significant improvement over prior apparatuses used for this purpose, such as apparatuses of the type described above. In particular, the improved apparatus permits the complete deburring and cleaning process to be carried out utilizing minimal floor space in the processing plant. Further, the entire cleaning process including the deflashing or deburring, washing, rinsing, airblowing and drying of the plastic-packaged electronic device can be easily automated and carried out as a continuous cycle. The overall operational efficiency and cleaning rate achieved by the process carried out in this improved apparatus thus represents a significant improvement over the prior structures.

In the apparatus of the present invention, there is provided a main housing chamber having a drum supported therein for incremental step-like rotation about a substantially horizontal axis. The drum has a plurality of axially extending walls which are spaced circumferentially therearound and project radially outwardly so as to define a plurality of radially-opening compartments. The drum also mounts a releasable holding device within each of the compartments adapted for holding a workpiece, such as a lead frame assembly. A slide assembly is linearly reciprocably mounted on the housing for cyclic movement generally parallel with the horizontal rotational axis, and mounts thereon a plurality of nozzle assemblies which are aligned with individual compartments in the drum so as to linearly reciprocate lengthwise of a respective compartment. With the drum in a first rotational position, one of the compartments is aligned with a first station which permits a finished workpiece to be removed from the holder and a further workpiece to be positioned therein. The drum is thereafter rotatably stepped to a second station wherein the previously loaded workpiece is subject to blasting with an abrasive slurry due to linear reciprocation of a slurry-blasting nozzle longitudinally of the compartment. During subsequent incremental steps to succeeding work stations, the workpiece is again subjected to subsequent treating steps such as washing, rinsing and drying due to respective nozzle arrangements being linearly reciprocated lengthwise of the respective compartment. Following completion of the required steps, the compartment returns to the original loading station whereupon the finished workpiece is removed. In this manner, the complete finishing (that is, the deburring and cleaning) of the workpiece is accomplished due to a series of rotatable incremental steps as the drum undergoes one revolution.

In the improved apparatus of the present invention, as briefly described above, there is provided a driving actuating mechanism which is disposed externally of the drum and which is designed to operate with a driven actuator arrangement mounted on the drum, one such driven actuator arrangement being associated with each compartment of the drum for controlling the respective workpiece holder mechanism. The driving actuating mechanism cooperates with the driven actuator mechanism which is disposed in the loading and unloading station.

In the improved arrangement of the present invention, as described above, there is also preferably provided an improved nozzle arrangement associated with the compartment in which the abrasive slurry is blasted against the workpiece. This nozzle arrangement involves an opposed pair of nozzles which are directed generally toward one another for simultaneously blasting opposite sides of the workpiece, and each of these nozzles has a generally elongated nozzle opening which extends transverse to the linear direction of reciprocation so as to discharge a wide band of abrasive slurry which can effectively abrasively clean the entire width of the workpiece during both the forward and rearward traverse of the nozzle arrangement.

Other objects and purposes of the improved apparatus of the present invention will be apparent upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Referring to FIGS. 1–5, there is illustrated an apparatus according to the present invention for effecting deburring and cleaning of articles (hereinafter referred to as workpieces), specifically electronic devices encapsulated with a plastic material and commonly referred to as lead frame assemblies. This apparatus includes a housing 11 having therein a drum 12 supported for incremental step-like rotation about a generally horizontally-extending rotational axis 13. This drum 12 mounts therein a plurality of workpiece holding mechanisms 14 in angularly spaced relationship therearound. A first drive means 15 is provided for causing rotatable indexing or step-like movement of the drum between successive angularly-spaced working or processing stations. A reciprocating gun or nozzle arrangement 16, which includes a plurality of separate guns or nozzles associated with different working stations as explained hereinafter, is disposed for cyclic linear reciprocating movement in a direction generally parallel with the rotational axis 13 so as to permit treating (such as cleaning, rinsing and drying) of the workpieces which are held on the drum at the various processing stations. This gun arrangement 16 is reciprocated by a second drive means 17.

Figure 1:
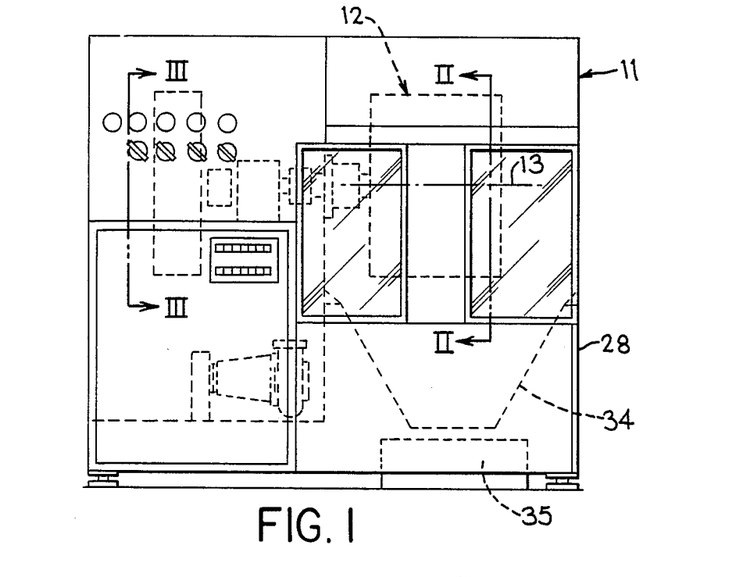
FIG. 1 is a side elevational view of an overall blasting apparatus incorporating therein a rotary horizontal drum according to the present invention.
Figure 2:
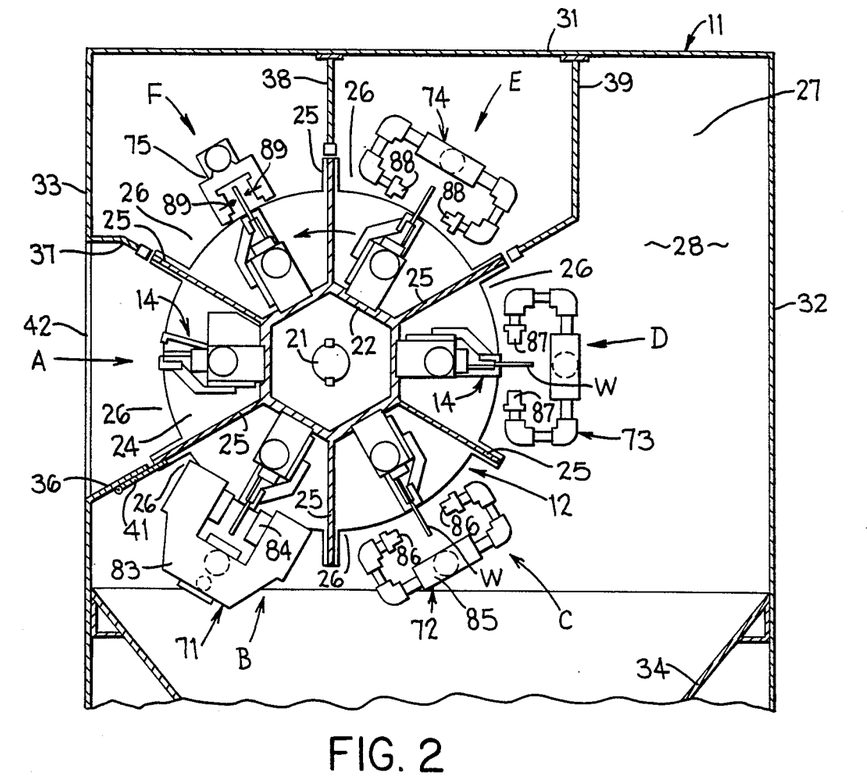
FIG. 2 is an enlarged, fragmentary sectional view taken through the drum substantially along line II—II in FIG. 1.
Figure 3:
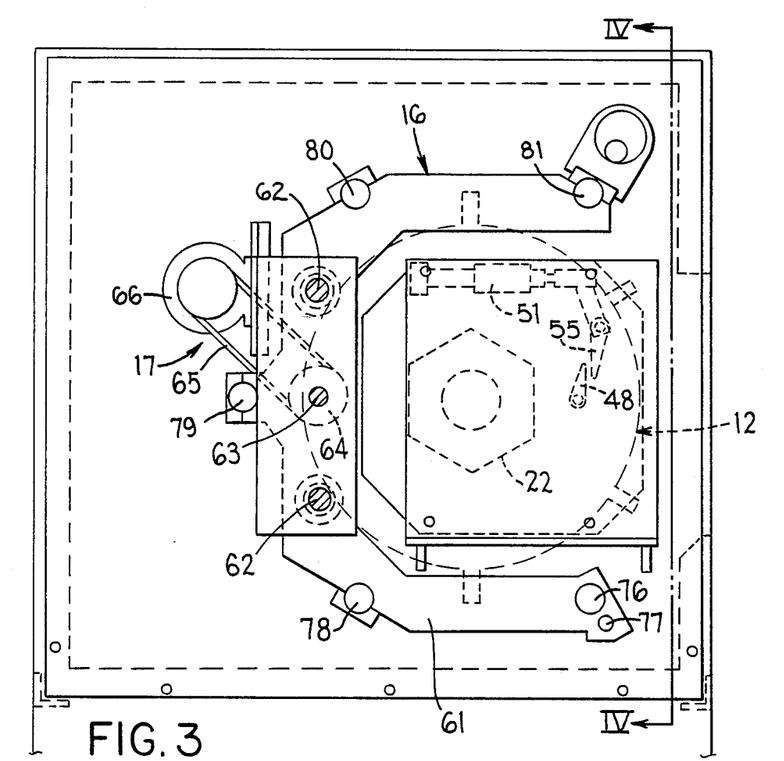
FIG. 3 is an enlarged fragmentary view taken substantially along line III—III in FIG. 1.

The drum 12 is secured to a rotatable horizontally-extending drive shaft 21 and includes an elongate tubular core 22 which concentrically surrounds the drive shaft 21 and has axially spaced and generally parallel end plates 23 and 24 fixed thereto and projecting radially outwardly therefrom. A plurality of partition or divider plates 25 are fixed to the core tube 22 and extend axially thereof between the end plates 23 and 24, which divider plates 25 project radially outwardly from the core tube and are substantially equally angularly spaced therearound. These divider plates 25 in cooperation with the core tube 22 and end plates 23–24 hence define a plurality of axially-elongate compartments 26 which are equally spaced circumferentially around the drum and open radially outwardly thereof. In the illustrated embodiment, the drum has six divider walls 25 spaced therearound which hence define six angularly spaced compartments 26. However, it will be appreciated that the number of divider walls and resulting compartments can be increased or decreased depending upon the number of treating stations or steps desired during each rotational cycle of the drum.

The drum 12 is disposed within a compartment 27 defined by the surrounding housing 11, which compartment 27 extends between a housing end wall 28 and a generally parallel intermediate divider wall 29. These walls 28 and 29 are joined by a housing top wall 31 and appropriate housing side walls 32 and 33.

The housing 11 also defines therein, in the region directly below the drum 12, a collecting chute or trough 34 which has an open upper end for collecting waste generated during the treating processes, which waste is collected by the downwardly converging chute 34 for deposit into a collecting tank 35.

Housing 11 also includes a plurality of intermediate partitions 36, 37, 38, 39 which are secured to the appropriate housing walls (such as the top and side walls) and which extend axially in generally parallel relationship to the drum and terminate in free edges which are disposed directly adjacent the radially outer free edges associated with some of the drum divider plates 25 when the drum is stationary, substantially as illustrated by FIG. 2.

More specifically, the housing partitions 36 and 37 project inwardly from the housing sidewall and cooperate with two circumferentially-adjacent divider plates 25 so as to define a first processing station A, this being the workpiece transfer station at which workpieces are loaded into and removed from the clamping mechanisms 14. Access to this station A occurs through a suitable access opening 42 formed in the housing sidewall.

In operation, the drum is rotatably stepped in a counterclockwise direction as appearing in FIG. 2, and hence there are defined subsequent working stations B, C, D, E and F which sequentially follow the workpiece transfer station A. Station B is a deburring and cleaning station wherein abrasive slurry is blasted against the workpiece to remove unwanted plastics material, station C is a first rinsing station at which a cleaning liquid such as clear water is blasted or sprayed against the workpiece to effect additional cleaning and removal of abrasive particles, and station D is a second rinsing station wherein clean rinsing liquid such as clean water is sprayed or blasted against the work piece to insure that all residue and particles are removed. All of stations B, C, and D are in open communication with the collecting trough 34. The next station, station E, is a drying station at which a drying gas such as air is sprayed or blasted against the workpiece to effect at least partial drying thereof. For this purpose, the housing partition 38 and 39 cooperate with circumferentially adjacent drum divider plates 25 to hence enclose the drying station E and isolate it from adjacent station D. The last station F is a further drying station and, in particular this station subjects the workpiece to a heated gas specifically heated air so as to insure full drying of the workpiece. Station F is also isolated from the adjacent stations by the housing partitions 37 and 38.

The housing partition 36 also has a sealing plate 41 provided along the edge thereof and adapted to overlap the drum divider plate 25 to prevent the liquids in station B from passing into the station A. This sealing plate 41 may adopt many different forms, and in this example is pivotally mounted on the housing and is spring urged upwardly for engagement with the underside of the drum divider plate, whereby it will not interfere with the rotational movement of the drum.

Figures 6, 7, 8:
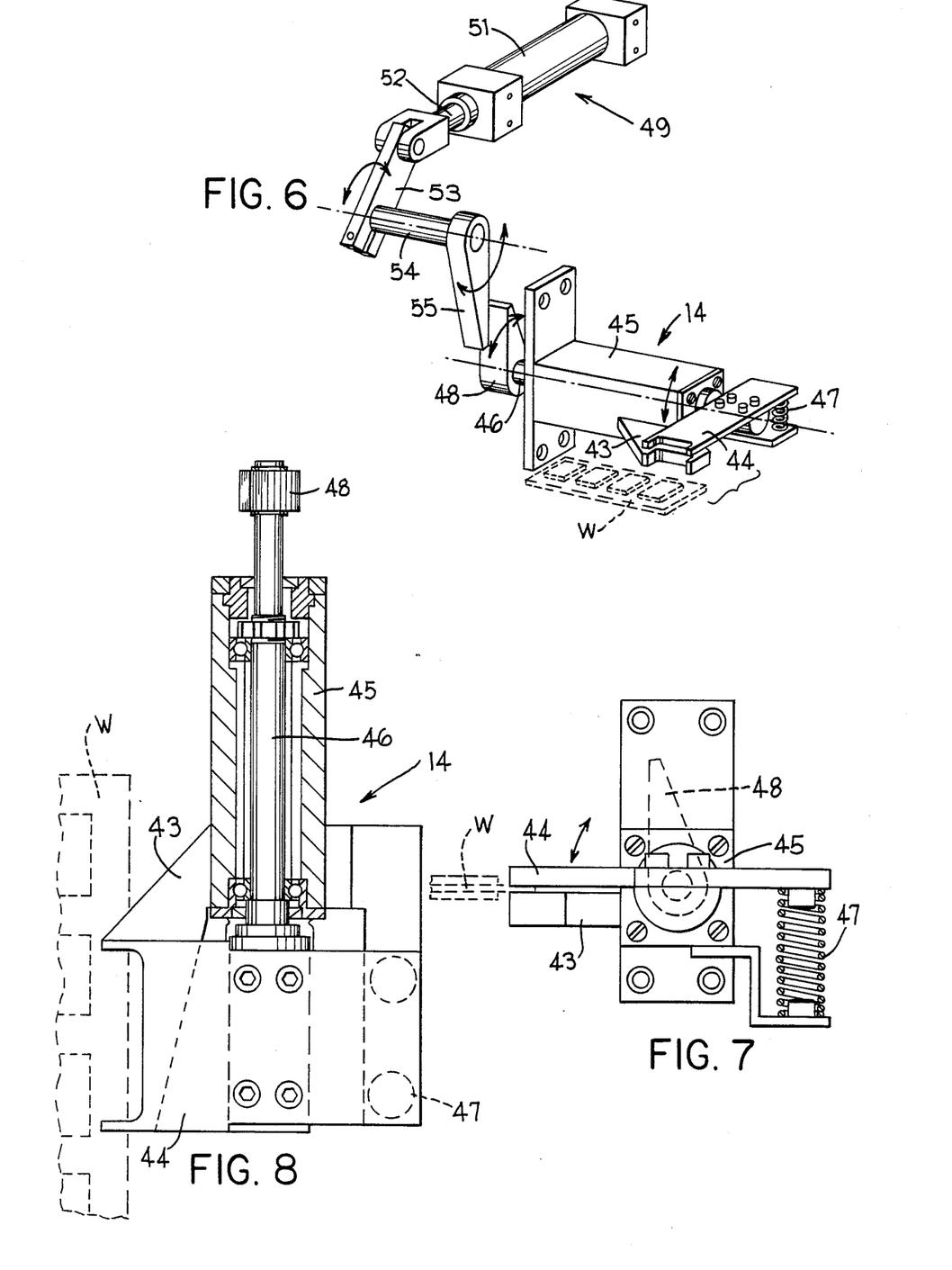
FIG. 6 is a perspective view of the actuating mechanism for the drum-mounted holding mechanism.
FIGS. 7 and 8 are end and top view respectively, of the holding mechanism.

Considering now the work holding mechanism 14, one of which is associated with each of the drum compartments 26, this mechanism is best illustrated in FIGS. 6–8. The work holding mechanism 14 includes first and second clamping members 43 and 44 adapted to clampingly engage an edge of the workpiece W therebetween, substantially as illustrated by FIGS. 7 and 8. The first clamping member 43 is fixedly secured to an elongate tubular support 45 which is disposed within respective drum compartment 26, this support 45 being cantilevered outwardly from and supported at one end thereof by the drum end plate 23. A pivot shaft 46 is rotatably supported within and extends through the tubular support 45 so that the axis of this pivot shaft 46 extends generally parallel with the rotational drum axis 13. Pivot shaft 46 projects outwardly beyond the free end of the support and has the second clamping member 44 secured thereto. The clamping members 43 and 44 hence project radially sidewardly from the pivot axis defined by the pivot shaft 46. Suitable springs 47 coact between the movable clamping member 44 and a Z-shaped bracket fixed to the support 45. These springs 47 continually urge the movable clamping member 44 counterclockwise in FIG. 7 toward a closed or position of clamping engagement substantially as illustrated by FIG. 7.

The pivot shaft 46, at its other end, projects through the drum end plate 23 and has a radially-projecting lever 48 secured thereto. This lever is angularly displacable in a clockwise direction in FIG. 7 so as to move the clamping member 44 into an open position.

To effect movement of the clamping lever 48, an activating mechanism 49 is provided so as to actuate the lever 48 which is positioned at station A, namely at the loading and unloading station. This activating mechanism 49 includes a linear driver (specifically a fluid pressure cylinder) 51 which has its housing mounted on the intermediate divider wall 29. The piston rod 52 of cylinder 51 projects outwardly and has the end thereof coupled to a lever 53, the latter being secured to a pivot shaft 54. Pivot shaft 54 is supported for rotation about a generally horizontally extending axis parallel with the drum axis 13, and pivot shaft 54 projects through the intermediate divider wall 29 and has its other end disposed closely adjacent the drum end plate 23. This end of pivot shaft 54 has a radially-extending driving lever 55 mounted thereon, the latter being adapted for engagement with the lever 48 of the work holder mechanism disposed at station A. By energizing the cylinder 51 so that the piston rod is extended (leftwardly in FIG. 6), this hence causes a counterclockwise rotation of driving lever 55 so that it engages lever 48 and rotates it clockwise (FIGS. 6 and 7) to effect opening movement of the clamping member 44.

Figure 5:
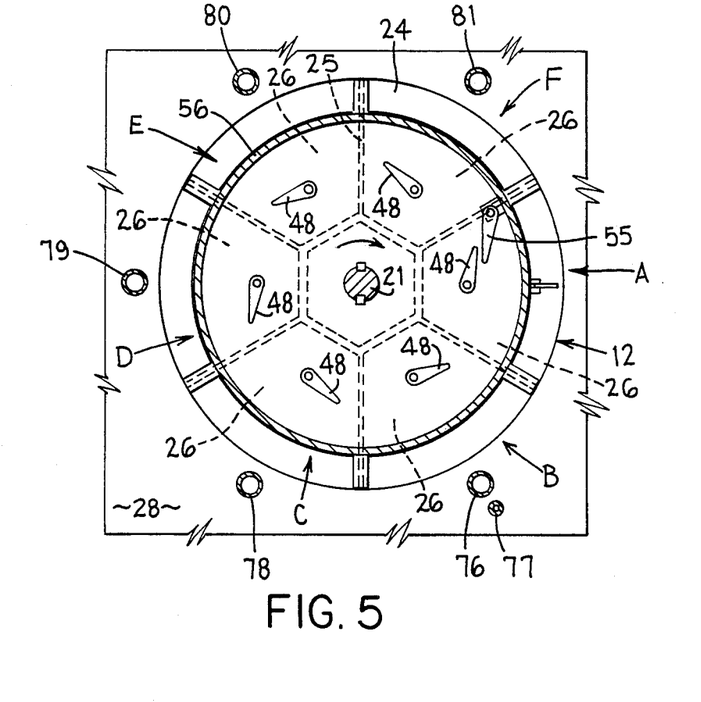
FIG. 5 is a view taken substantially along line V—V in FIG. 4.

Since each drum compartment 26 has a work holding mechanism 14 associated therewith, and each of the latter mechanisms has a lever 48, these levers are spaced circumferentially around the drum as illustrated by FIG. 5. Hence, as the drum is angularly incremented from station to station, a new lever 48 always moves into the loading and unloading station A so as to be disposed adjacent the driving lever 55, whereby the single activating mechanism 49 is able to engage and activate the clamping mechanisms disposed at station A.

To effect rotary stepwise movement of the drum 12 from station to station, the first drive means 15 includes an indexing drive device 58 which is drivingly connected to the main drive shaft 21. The indexing drive device 58 is conventional and may comprise any well known type of mechanism, such as a stepping motor or a continuously-driven motor cooperating with an indexing mechanism of any conventional type, such as a Geneva type mechanism. The indexing drive device 58 is mounted on a suitable bracket 59 which is secured relative to the housing.

Considering now the reciprocating gun or nozzle arrangement 16, it includes a generally U-shaped head 61 which opens sidewardly and which is slidably supported on a pair of generally parallel guide rods 62. These guide rods 62 are stationarily supported on the housing and extend in generally parallel relationship with the horizontal rotational axis 13 of the drum. The U-shaped head 61 is slidably reciprocated back and forth on the guide rods 62 by means of the second drive means 17. This latter drive means 17 includes a threaded drive spindle 63 which is rotatably supported on the housing in parallel relationship to the guide rods 62. Spindle 63 has a pulley 64 thereon engaged with a drive belt 65, the latter in turn being engaged with and driven by the drive pulley of a conventional drive motor 66, such as an electric motor. This drive motor 66 is generally reversible or bi-directional to drive the head 61 in a reciprocating manner.

The gun arrangement 16 also includes a plurality of nozzles or gun assemblies 71 to 75 which are mounted on the reciprocating head 61 so as to be reciprocated thereby. All of these gun assemblies 71–75 are disposed so as to reciprocate back and forth in a direction axially along the drum in the vicinity of the periphery thereof. Each gun assembly is disposed at a single predetermined station, specifically at stations B through F.

The gun assembly 71 as associated with station B is for the purpose of discharging an abrasive slurry against the workpiece positioned at that station. The gun assembly 71 is fixedly mounted at the outer end of a support tube 76, the latter projecting slidably through the intermediate divider wall 29 and being fixedly carried by the U-shaped head 61. Support tube 76 extends generally parallel with the rotational axis 13 and comprises a hollow conduit through which the slurry can be supplied. The rearward (leftward) end of support tube 76 is connected to a suitable pressurized slurry source (not shown). A further auxiliary support tube 77 extends parallel to the support tube 76 and connects at its forward or free end to the gun assembly 71 to supply pressurized air thereto. This auxiliary support tube 77 is also fixedly carried on the U-shaped head 61 and the rearward (leftward) end of this tube 77 is joined to a suitable source of pressurized air.

In similar gun assemblies 72–75 are respectively carried on the free forward ends of support tubes 78–81 respectively. All of these support tubes 78–81 are also carried by the U-shaped head 61 and project in parallel relationship with the rotational axis 13. The rearward ends of support tubes 78 and 79 are connected to sources of rinsing liquid, such as clean water. The rearward end of support tube 80 is connected to a source of pressurized air. The support tube 81 also has its rear end connected to a source of pressurized air. The air supplied to tube 81 can be heated at the source or, alternatively, the air supply to the tube can be at room temperature and then heated by a suitable heater mounted directly of the gun assembly 75.

The gun assembly 71, as diagrammatically illustrated in FIG. 2, includes a generally U-shaped head or housing 83 which, in the opposed arms thereof, defines a pair of generally opposed nozzles 84. These nozzles 84 are positioned on opposite sides of the workpiece and hence direct the discharged fluid inwardly toward the opposite sides of the workpiece. The head 83 contains therein suitable internal passages for the slurry and air which are supplied to and mixed directly at the nozzle.

The other gun assemblies 72–75 are generally similar. For example, the gun assembly 72 also includes a generally U-shaped head 85 having internal conduits therethrough which terminate in a pair of opposed nozzles 86 which are disposed on opposite sides of the workpiece for directing discharged streams inwardly against the workpiece. The gun assemblies 73–75 are generally similar and include opposed pairs of nozzles 87, 88 and 89, respectively, which are located on opposite sides of the workpiece associated with the respective processing station.

For protective and sealing purposes, each of the gun assemblies 71, 72 and 73 as associated with stations B, C and D have one end of an elongate sealing member such as a bellows 91 secured thereto. The other end of this bellows is secured to the intermediate divider wall 29.

A substantially cylindrical shroud 92 is fixed to the intermediate housing wall 29 and projects coaxially therefrom toward the drum end plate 23. This shroud surrounds the levers 48 to protect them from the liquids utilized at stations B through D.

OPERATION

The operation of the apparatus will be briefly described to insure a complete understanding thereof.

With the drum 12 stationed and positioned as illustrated in FIG. 2, the previously-deburred and cleaned workpiece W is removed from the work holder at station A and replaced with another workpiece which has not yet been cleaned. This loading and unloading of workpieces can be accomplished manually, but is preferably accomplished by means of an automatic transfer mechanism.

Simultaneous with the loading and unloading of workpieces at station A, the second drive means 17 is energized and causes the U-shaped head 61 to be slidably reciprocated forwardly and rearwardly (rightwardly and leftwardly respectively in FIG. 4) through one cycle, and this in turn causes the gun assemblies 71–75 to reciprocate forwardly and rearwardly through one cycle in straddling relationship to the workpieces associated with the respective work stations. During this reciprocating cycle of the respective gun assemblies, each directs opposed streams toward the respective workpiece so as to impinge against opposite sides thereof. For example, slurry is blasted against opposite sides of the workpiece at station B, clean water is blasted against the workpieces in stations C and D, cool air for drying purposes against the workpiece at station E, and heated air for drying of the workpiece at station F. Thus, during each stoppage of the drum during which a workpiece is unloaded and reloaded at station A, five other operations are being simultaneously carried out in remaining stations B through F.

Figure 4:
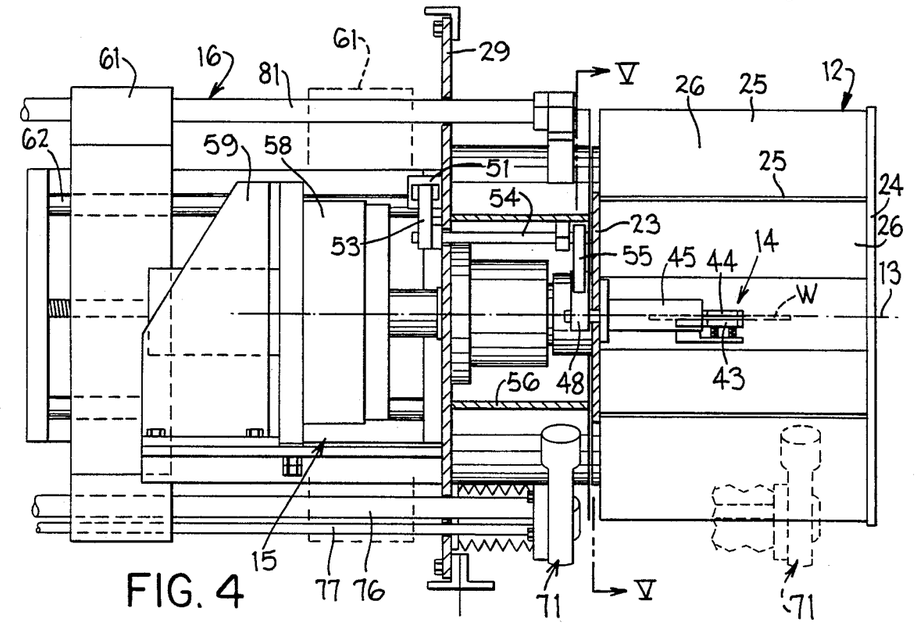
FIG. 4 is a fragmentary section view taken substantially along line IV—IV in FIG. 3.

After the workpiece has been reloaded at station A and all of the guns returned to their original retracted positions substantially as illustrated by FIG. 4, in which position the guns are disposed between the housing divider wall 29 and the drum end wall 23, then the indexing drive device 58 causes the drum 17 to be rotated (counterclockwise in FIG. 2) through one step. This step, being an angle of 60 in the illustrated embodiment, causes the newly loaded workpiece to be moved into station B, and all of the other workpieces are respectively advanced one work station. The overall cycle is then repeated so that, after six indexing movements, the workpiece has been completely processed and returned to station A for unloading.

With this apparatus, the clamping members 43 and 44 can be provided with suitable masking devices thereon, if necessary, so as to protect selected portions or regions of the workpiece.

In addition, the linear advancing and retracting speed of the nozzle arrangement 16 is preferably adjustable by means of a suitable controller such as an inverter or a pneumatic control system associated with the drive means 17 so as to provide for optimum movement rate of the nozzles along the workpieces.

In addition, for workpieces which require substantial deburring and cleaning, the drum can be provided with additional compartments 26 if necessary, whereby additional processing steps can hence be carried out during each cycle of the drum, such as inclusion of a second blasting station between stations B and C.

NOZZLE DIRECTOR

Referring now to FIGS. 9-16, there is illustrated a preferred structure of the nozzle assembly 71. This nozzle assembly 71 includes a pair of slurry passages 101 and a pair of air passages 102 which extend through the arms of the U-shaped head 83 for communication with the opposed nozzles 84. The nozzles 84 are identical and hence only one thereof will be described.

Figures 9, 10, 11, 12, 13, 14, 15, 16:
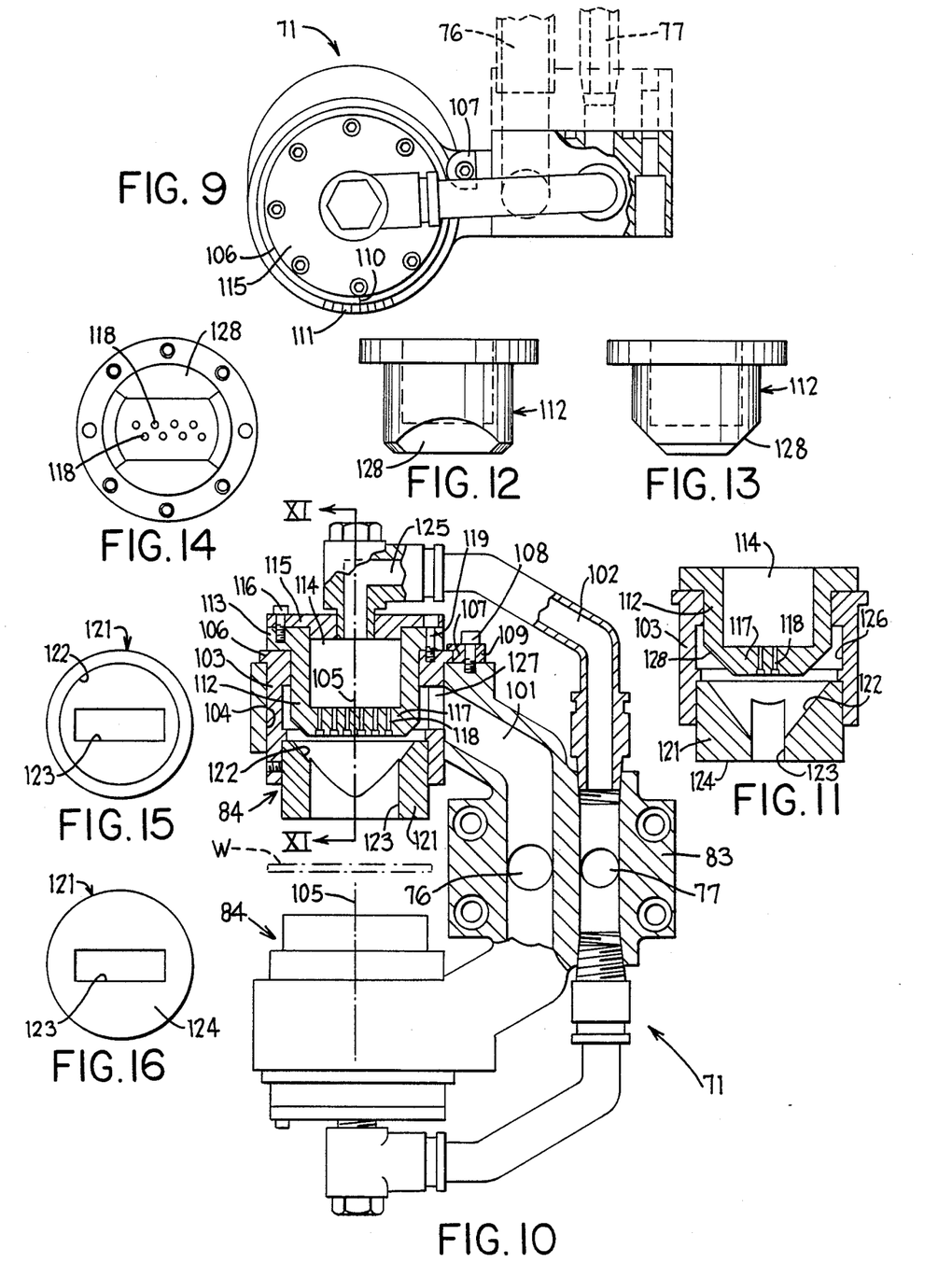
FIG. 9 is an end view of a preferred embodiment of the slurry nozzle arrangement for use with the apparatus of FIGS. 1–8.
FIG. 10 is a generally plan view of the nozzle arrangement of FIG. 9.
FIG. 11 is a sectional view taken generally along line XI—XI of FIG. 10.
FIG. 12 is a side view of the jet member.
FIG. 13 is a further side view which is taken perpendicular to that of FIG. 12.
FIG. 14 is a view showing the discharge end thereof.
FIGS. 15 and 16 are views showing the opposite ends of the nozzle member.

The nozzle 84 includes a generally sleeve-like body 103 seated within a cylindrical opening 104 which extends transversely through the arm of the head 83 adjacent the free end thereof. This body 103 defines a nozzle axis 105. The body 103 has a surrounding flange 106 which overlaps the head 83. A releasable holding member 107, secured by a bolt 108, is provided with a flange or lip which overlaps the body flange 106 for securing the body 103 to the head 83. This holding member 107 can be readily released, as by loosening the fastener 108, so as to permit the entire nozzle 84 to be readily manually rotated about the axis 105 so as to select the desired orientation of the nozzle, as will apparent from the description hereinafter. For this purpose, the upper surface of the body flange 106 has an orienting or indicia mark 110 thereon which can be radially aligned with any one of a series of indicia or marking 111 formed on the exposed surface of the arm so as to permit desired orientation of the nozzle 84.

Nozzle 84 also includes two additional members, namely a jet member 12 and a nozzle member 21. These members are disposed closely adjacent and in coaxial alignment with one another, and are fixedly mounted on the body member 103.

The jet member 112 is generally cup shaped and is seated generally within the outer end of a cylindrical opening which extends through the body 103. Jet member 112 has a surrounding top flange 113 which overlies the body 103, and the jet member defines therein a generally cylindrical chamber 114 which is closed at its upper end by a cover 115. This cover 115 is secured to the jet member 112 by a plurality of fasteners 116. One or more additional fasteners 119 secure the jet member and cover to the body 103.

The jet member at its inner end terminates in an end wall 117 which defines a jet opening therethrough, which jet opening is defined by a plurality of small holes or orifices 118 extending perpendicularly therethrough in generally parallel relationship to the nozzle axis 105.

The plurality of holes or orifices 118 are arranged so as to define an elongate or oblong jet opening. This is accomplished in the illustrated embodiment by providing the plurality of openings 118 arranged in two generally parallel rows disposed in close relationship to one another, with the openings in adjacent rows being in staggered relationship to one another so that the two rows of openings hence define a zig-zag pattern as illustrated by FIG. 14. For purposes of uniformity, the orifices in one row, when viewed sidewardly relative to the adjacent row, are located midway between the orifices of the adjacent row. It will be appreciated, however, that the number of rows of orifices, the number of orifices in each row, and the exact pattern or arrangement of the plurality of orifices 118 can be selectively varied so as to provide the desired elongate or oblong (that is, substantially elongate rectangular) jet opening.

The nozzle member 121 is disposed directly adjacent and aligned with the discharge end of the jet member 112 and, in the illustrated embodiment, this nozzle member 121 comprises a generally cylindrical sleeve-like member which is stationarily seated within the cylindrical opening formed in the body 103 so as to project outwardly therefrom concentric with the nozzle axis 105. This nozzle member 121 has a flow passage extending coaxially therethrough and formed by a wide inlet opening 122 which projects inwardly of the member 121 from its inner end. This wide inlet opening 122 is of a converging relationship as it projects axially inwardly (that is downwardly in FIG. 10) of the member and is preferably formed of a converging conical configuration.

The flow passage through nozzle member 121 also includes an outlet opening 123 which projects inwardly from the lower or discharge end 124 for communication with the inlet opening 122. This outlet opening 123 is, as illustrated by the drawings, of an elongate or oblong cross-sectional configuration. In a preferred embodiment, the cross-sectional configuration of this discharge opening 123 is an elongate rectangle (with either square or slightly rounded corners), or as an alternative this cross section may be formed as an elongate ellipse. The outlet opening 123 is disposed with its elongate direction extending parallel with the direction of the rows of orifices 118.

The air and slurry are initially respectively supplied to the jet member 112 and nozzle member 121. For this purpose, the air passage connects to an appropriate fitting 125 which removably connects to the cover 115 so that the pressurized air is supplied coaxially into the chamber 114 substantially along the axis 105. The pressurized air is then discharged through the nozzle jet defined by orifices 118 so that the nozzle jet is of an elongate configuration which is then discharged directly downwardly through the similarly configured outlet opening 123 of the nozzle member 121.

At the same time, the slurry from passage 101 is supplied through an opening 127 formed in the sidewall of the body member 103 into an interior annular groove or channel 126 formed inside the body 103 in surrounding relationship to the jet member 112. From this channel 126 the slurry is sucked downwardly around the lower end of the jet member 112 into the enlarged inlet opening 122 and then discharged by the air jet through the outlet opening 123 for blasting against a workpiece W. To facilitate the proper sucking and entrainment of the slurry into the air jet, the axially adjacent ends of the jet member 112 and nozzle member 121 have a narrow annular passage defined therebetween so as to permit communication with the slurry channel 126. Further, the diametrically opposite sides of the jet member 112, at the lower or discharge end thereof, are provided with flats 128 which convergingly taper downwardly toward the enlarged inlet opening 122. These flats 128 are formed on opposite sides of and extend generally parallel with the elongate direction of the jet nozzle defined by openings 118 so as to assist in properly guiding the slurry into the elongate cross-sectional configuration of the air jet.

As illustrated by FIGS. 10 and 11, the lower or discharge end of the jet member 112 is disposed closely adjacent, such as substantially at, the plane defined by the upper end of the nozzle member 121.

While the opposed nozzles 84 can be oriented so that their axes 105 are aligned, nevertheless it is preferred that the axes 105 of the opposed nozzles 84 be slightly inclined with respect to one another.

If desired or necessary, the nozzle arrangement 71 can be provided with suitable control structure, such as valves, to permit either of the opposed nozzles 84 to be utilized independently of the other. For example, appropriate valves can be provided in association with the slurry passages 101 so that slurry can be provided to only one of these passages and not the other, and similar valves can be provided with the air passages 102. Alternately, separate air supply conduits can be provided for individual connection to the pair of air passages 102. This hence permits the device to be utilized when finishing on only one side of the workpiece W is desired.

In the improved nozzle arrangement of this invention, the discharged slurry hence exhibits a uniform intensity substantially throughout the elongate pattern thereof, and hence during one passage of the nozzle along the workpiece W, a uniform blasting of the workpiece can be achieved across the complete width thereof as the nozzle traverses longitudinally therealong. It has been further observed that this nozzle arrangement permits the force of the ejected slurry to be significantly increased in comparison to the required increase in air volume, when compared with conventional blasting guns having nozzles defined by a straight round hole or orifice. The processing capability or efficiency of the improved nozzle of this invention thus represents a significant increase over that of conventional blasting guns.

Further, the nozzle 84 can be readily rotated relative to the holder about the axis 105 so as to selectively vary the orientation or phase of the elongate jet relative to the workpiece, thereby permitting the jet to be selectively adjusted to provide optimum finishing of the workpiece in relationship to the workpiece width. This nozzle is also extremely simple since the complete nozzle can be readily removed from the holder and some or all of the members readily replaced.

Referring to FIGS. 17–22, there is illustrated a variation of the improved gun assembly. Due to the substantial similarity, corresponding parts have been designated by the same reference numerals but with the addition of a prime (') thereto.

Figure 20:
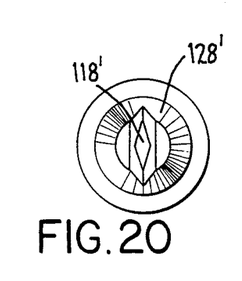
FIG. 20 shows the discharge end of the jet member of FIG. 18.
Figure 21:
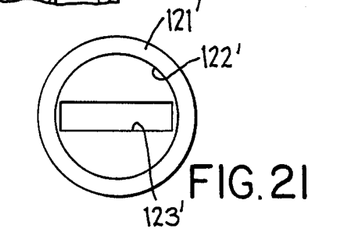
FIGS. 21 and 22 illustrate opposite ends of the nozzle member appearing in FIG. 18.
Figure 22:
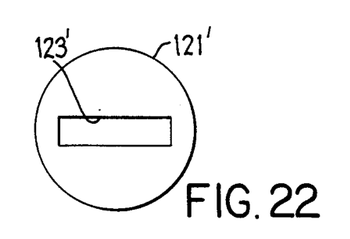

In this variation of the nozzle arrangement 71', pressurized air is supplied to the pressure chamber 114' through openings 131 and 132. The upper end of the jet member is closed, as by a plug. The lower or discharge end of the jet member 112 has an elongate jet opening 118' extending axially therethrough. This jet opening 118' is formed substantially as a single slot which, in cross section, is elongated in a direction generally parallel to the elongate outlet opening 123'. This elongate jet opening 118' may be of a generally elongate rectangular configuration but, as illustrated by FIG. 20, is of an elongate diamond-shaped cross section. It can also be an elongate elliptical cross section.

Figure 17:
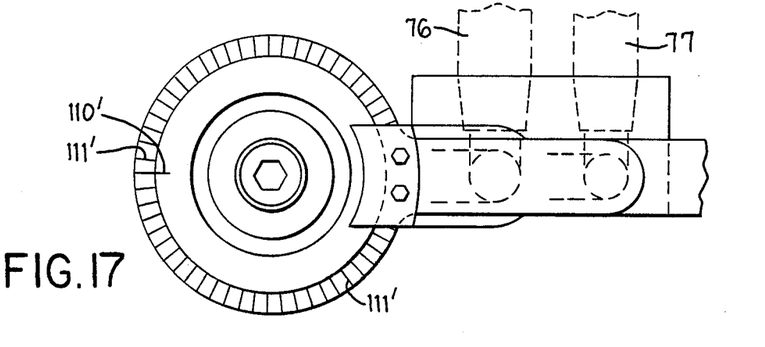
FIG. 17 is an end view similar to FIG. 9 but illustrating a modified nozzle arrangement for blasting slurry.
Figure 18:
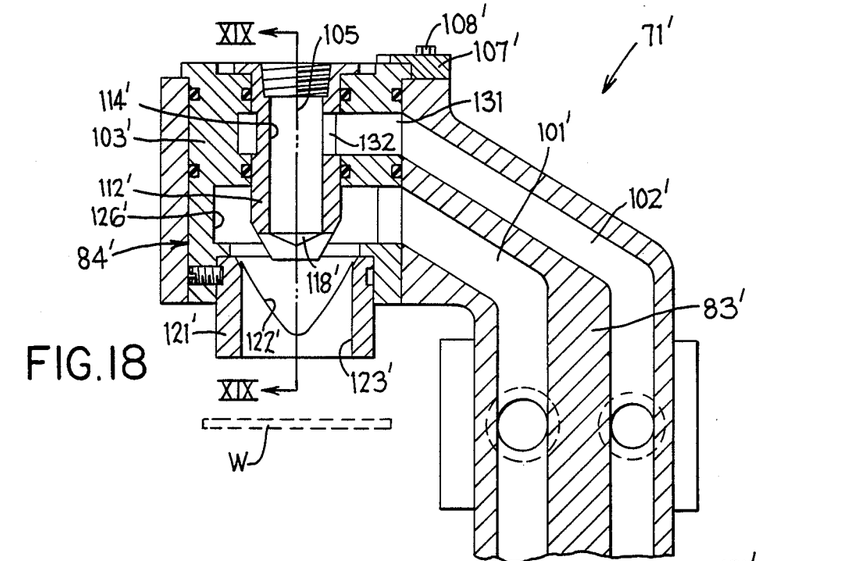
FIG. 18 is a plan view of the nozzle arrangement of FIG. 17, only one of the opposed pair of nozzles being shown, the other being symmetrically arranged about a central plane.
Figure 19:
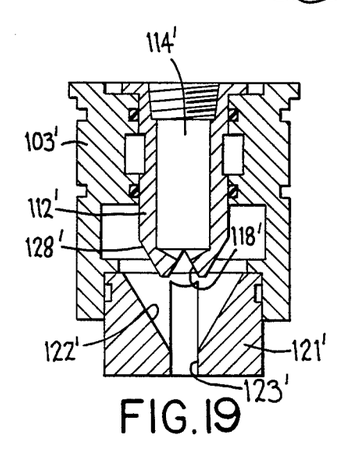
FIG. 19 is a sectional view taken substantially along line XIX—XIX of FIG. 18.

In the illustrated arrangement, the discharge end of the jet chamber 114' terminates in a generally outwardly projecting conical recess, and a generally V-shaped slit extends transversely across the end of the jet member and opens upwardly for communication with the conical recess for defining the jet opening 118'. The outer annular wall 128' of the jet member adjacent the discharge end is also of a truncated conical configuration which converges inwardly toward the free end to assist in the sucking of slurry downwardly into the inlet opening 122'. The lower free end of the jet member 112' is disposed substantially at or slightly inwardly from the plane defining the upper end of the nozzle member 121'.

The improved nozzle arrangement of the present invention, specifically as described above, is highly desirable for use in conjunction with a shallow and narrow but elongate blasting chamber, such as the compartments 26 associated with the rotatable drum. Such compartments provide minimal width between the circumferentially-adjacent divider plates 25, particularly since the width of the compartment must accommodate not only the workpiece extending centrally therealong, but also a pair of opposed nozzles disposed between the divider plates on opposite sides of the workpiece. Most conventional nozzles require substantial length as measured along the discharge direction, whereas on the other hand the improved nozzles of the present invention significantly minimize the length of the nozzle as measured along the discharge direction, and hence a pair of opposed nozzles can hence be sized and fit within the narrow compartments 26 so as to perform a highly desirable blasting operation. The configuration of the jet opening also provides a much more uniform surface treatment of the workpiece across the full width thereof during a single pass of the nozzle along the workpiece, both during the advancing and the retracting strokes.

With this improved nozzle arrangement, the single blasting nozzle can uniformly blast a rather wide area of a workpiece during a single pass, with the width of the nozzle being selectively adjusted to conform with the workpiece width merely by rotating the nozzle body. In contrast, conventional structures utilizing small circular discharge orifices have not only resulted in substantial nonuniformity across the diametrical width of the nozzle spray pattern, but have also often required the positioning of several nozzles in staggered or offset relationship in order to attempt to finish a rather wide path. This latter arrangement is not only structurally and functionally more complex, but does not result in a uniformly-finished wide path, such as is possible with the improved nozzle arrangement of this invention.

The nozzles are suitable for both liquid and air blasting of abrasive particles.

TRANSFER MECHANISM

Figure 23:
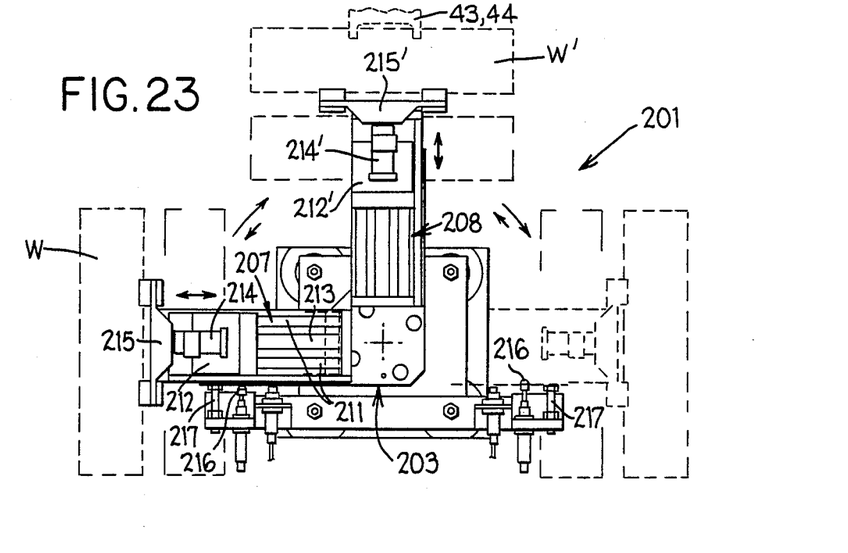
FIG. 23 is a top view of a transfer mechanism for loading and unloading workpieces.
Figure 24:
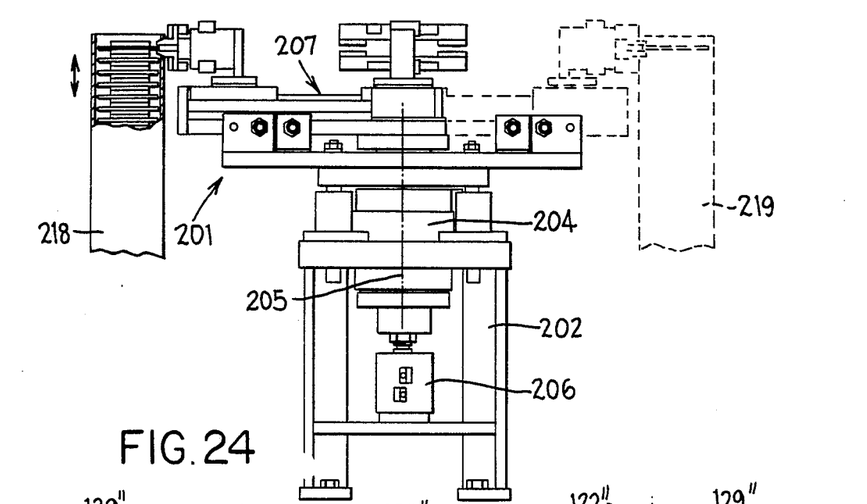
FIG. 24 is an elevational view thereof.

Referring to FIGS. 23 and 24, there is illustrated a transfer mechanism 201 which is disposed adjacent the housing side wall for effecting unloading of the finished workpiece from station A, and loading of a further workpiece into the respective workpiece holder.

The transfer mechanism 201 includes an upright support frame 202 on which is supported a transfer table 203, the latter being supported for both limited vertical reciprocation and angular rotation back and forth through a limited angular extent, specifically 90°. More specifically, the transfer table is supported on an angular drive unit 204 which is capable of angular oscillation back and forth through an angle of 90° about a substantially vertical axis 205. This hence enables the table to be angularly displaced back and forth between the solid and dotted line positions illustrated by FIG. 23. The complete transfer table add drive are supported on a vertical motor 206, such as a fluid pressure cylinder, which is capable of raising and lowering the transfer table through a small vertical extent.

The transfer table 203 is generally L-shaped and includes a pair of arms 207 and 208 which project radially outwardly from the rotational axis 205. These arms 207 and 208 are disposed in generally perpendicular relationship to one another. Arm 207 has a pair of stationary parallel guide rods 211 which project generally radially outwardly for slidably supporting thereon a driving device 212, the latter being a fluid pressure cylinder. This pressure cylinder 212 has its piston rod 213 fixedly related in parallel relationship to the guide rods 211 so that, when energized in one direction or the other, the housing of the cylinder 212 can reciprocate radially inwardly and outwardly with respect to the rotational axis 205. The outermost position of this cylinder 212 is illustrated by solid lines in FIG. 23, and the innermost position is indicated by dotted lines. The main pressure cylinder 212 mounts thereon a secondary pressure cylinder 214 which controls a clamping mechanism 215 adapted to clampingly engage an edge of the workpiece W. The piston rod of cylinder 214 projects radially outwardly and, in a conventional manner, coacts with suitable wedges or links for controlling opening and closing of opposed upper and lower jaws associated with the clamping device 215 so as to either grip or release the edge of the workpiece W.

The other table arm 208 has a similar actuating and clamping mechanism associated therewith, and hence corresponding parts have been designated by use of the same reference numerals but with addition of a prime (') thereto.

In operation, a plurality of workpieces which are to be treated are vertically stacked within a suitable holder 218, the uppermost workpiece W of the stack being indicated by dotted lines on the left side of FIG. 23. At the same time, another workpiece W' which has already been deburred and cleaned is now located at station A and is being held by the clamping jaws 43 and 44. In this position, with the cylinders 212 and 212' in their innermost position, they are both energized to extend the clamping jaws 215 and 215' to their outermost position, these latter clamping mechanisms being open so as to permit engagement with the edge of the workpieces W and W'. Cylinders 214 and 214' are energized to engage the edges of the workpieces W and W', and at the same time the jaws 43 and 44 release the workpiece W'. Cylinder 206 is energized to effect a slight lifting of the transfer table 203 and of the workpieces W and W', following which the cylinders 212 and 212' are energized to retract the workpieces into the dash-dot positions illustrated in FIG. 23. The rotary drive 204 is energized to swing the transfer table through a 90° clockwise rotation as viewed in FIG. 23. Cylinders 212 and 212' are again extended outwardly so that the workpiece W is now positioned with its edge between the open jaws 43 and 44, and the other workpiece W' is positioned over a second holder 219 in which the finished workpieces are vertically stacked. Cylinder 206 is then lowered back to its original position, following which cylinders 214 and 214' are reversely energized to release the clamping mechanisms 215 and 215'. Cylinder 212 and 212' are then reversely energized to retract the clamping mechanisms, following which drive device 204 is reversely energized to swing the transfer table counterclockwise 90° back to its original position. The cylinders 212 and 212' can then be again energized outwardly so as to repeat the transfer cycle.

Appropriate limit switches and stops 216 and 217 cooperate with the arms 207 and 208 for defining the limit positions of the swinging movement.

Figure 25:
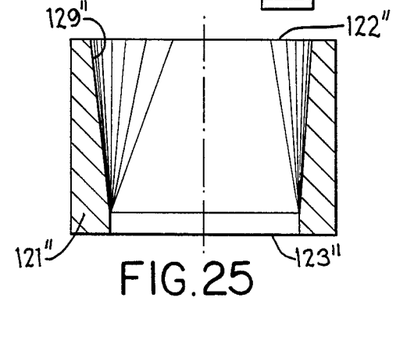
FIGS. 25 and 26 respectively represent central cross sectional views, taken in perpendicular relationship to one another, through a preferred embodiment of the nozzle member.
Figure 26:
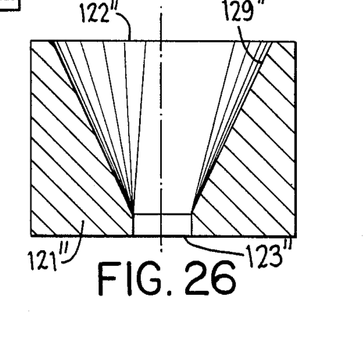

Referring now to FIGS. 25 and 26, there is illustrated in cross section a preferred configuration for the nozzle member 121", which nozzle member can be substituted for the nozzle members 121 or 121' described above.

This modified nozzle member 121" again has a generally circular opening 122" formed in the upper or inlet end face thereof, and an elongated slot-like outlet or discharge opening 123" formed in the lower end face thereof, this discharge opening 123" being formed generally as an elongate rectangle or as an elongate ellipse. In this preferred embodiment of the nozzle member, however, the inlet opening 122" and the outlet or discharge 123" are joined by an annular wall 129" which smoothly blends or merges from the circular opening 122" to the rectangular discharge opening 123" as this wall 129" extends axially therebetween. This annular wall, as it projects axially downwardly away from the circular inlet opening 122", basically forms a parabolic or elliptical shape as it projects axially downwardly and then smoothly blends or merges into the elongate discharge opening 123".

Other objects and purposes of the invention will be apparent to persons familiar with structures of this general type upon reading the following specification and inspecting the accompanying drawings.

The embodiments of the invention in which an exclusive property or privilege is claimed are defined as follows:

1. A blasting apparatus for cleaning and deburring workpieces, such as electronic devices encapsulated by synthetic resin, comprising:

housing means defining ga substantially closed blasting chamber therein;

rotary drum means disposed within said blasting chamber and supported for rotation about a substantially horizontal rotational axis;

drive means connected to said drum means for effecting rotational movement of said drum means about said rotational axis in an intermittent step-like manner so that the drum means is rotated through a plurality of equal angular steps during each revolution thereof;

said drum means defining therein a plurality of axially elongated compartments which open radially outwardly, said plurality of compartments being uniformly circumferentially spaced around the rotational axis of said drum means and being circumferentially separated from one another by intermediate divider walls;

a plurality of workpiece holding means mounted don said drum means, one of said workpiece holding means being positioned within each of said compartments, said workpiece holding means having clamping means for holding a said workpiece so that the workpiece is oriented so as to extend generally axially of the drum;

said housing means including means cooperating with said drum means with the drum means is stationary and defining a station for permitting access to one of the compartments to permit loading and unloading of workpieces with respect to the workpiece holding means associated with said one compartment; and a gun arrangement for deburring and cleaning workpieces mounted on said drum means within the remaining compartments, said gun arrangement including head means mounted don said housing for reciprocating back-and-forth movement in a cyclic manner through a predetermined stroke along a direction which is parallel to said rotational axis, said gun arrangement including a plurality of nozzle assemblies mounted don said head means in circumferentially spaced relationship with one another so that each said nozzle assembly cooperates with a selected one of said remaining compartments and axially traverses forwardly and backwardly along the compartment during each reciprocating cycle of the head means for directing a treating fluid against the workpiece held within the respective compartment, each said nozzle assembly including a generally U-shaped head having a pair of arms which effectively straddle the workpiece in the respective compartment and which mount thereon a pair of generally opposed discharge nozzles for permitting substantially simultaneous treating of opposite sides of the respective workpiece.

2. An apparatus according to claim 1, wherein a first said nozzle assembly discharges an abrasive slurry against the workpiece in the respective compartment, wherein a second said nozzle assembly which is circumferentially spaced from the first nozzle assembly in the direction of drum rotation discharges a cleaning liquid against the workpiece in the respective compartment, and wherein a third said nozzle assembly which is spaced circumferentially from the second nozzle assembly in the direction of drum rotation discharges air against the workpiece in the respective compartment for effecting drying of the workpiece.

3. An apparatus according to claim 2, wherein each said discharge nozzle as associated with said first nozzle assembly has a discharge opening which is of an elongate configuration similar to an elongate rectangle for forming a spray discharge of slurry which has an elongate cross section which extends in transverse relationship to the axially elongate direction of the workpiece to permit treating of the entire width of one side surface of the workpiece during the movement of the nozzle relative thereto.

4. A blasting apparatus for cleaning and deburring workpieces, such as electronic devices encapsulated by synthetic resin, comprising:
  housing means defining a substantially closed blasting chamber therein;
  rotary drum means disposed within said blasting chamber and supported for rotation about a substantially horizontal rotational axis;
  drive means connected to said drive means for effecting rotational movement of said drum means about said rotational axis in an intermittent step-like manner so that the drum means is rotated through a plurality of equal angular steps during each revolution thereof;
  said drum means defining therein a plurality of axially elongated compartments which open radially outwardly, said plurality of compartments being uniformly circumferentially spaced around the rotation axis of said drum means and being circumferentially separated from one another by intermediate divider walls;
  a plurality of workpiece holding means mounted on said drum means, one of said workpiece holding means being positioned within each of said compartments, said workpiece holding means having clamping means for holding a said workpiece so that the workpiece is oriented so as to extend generally axially of the drum;
  said housing means including means cooperating with said drum means when the drum means is stationary and defining a station for permitting access to one of the compartments to permit loading and unloading of workpieces with respect to the workpiece holding means associated with said one compartment;
  a gun arrangement for deburring and cleaning workpieces mounted on said drum means within the remaining compartments, said gun arrangement including head means mounted on said housing for reciprocating back-and-forth movement in a cyclic manner through a predetermined stroke along a direction which is parallel to said rotational axis, said gun arrangement including a plurality of nozzle assemblies mounted don said head means in circumferentially spaced relationship with one another so that each said nozzle assembly cooperates with a selected one of said remaining compartments and axially traverses forwardly and backwardly along the compartment during each reciprocating cycle of the head means for directing a treating fluid against the workpiece held within the respective compartment;
  each said workpiece holding means including a pair of opposed and relatively movable clamping members adapted for clamping a workpiece therebetween, and a driven actuating structure associated with each said workpiece holding means for controlling the opening and closing movement of said clamping members; and
  a driving actuating structure mounted on said housing and cooperating solely with the driven actuating structure associated with the workpiece holding means disposed at the loading and unloading station for activating said driven actuating structure to permit opening of said workpiece holding means.

5. An apparatus according to claim 4, including transfer means for automatically removing a finished workpiece from the clamping mechanism disposed at said loading and unloading station and thereafter loading a further workpiece into said clamping mechanism.

6. An apparatus according to claim 5, wherein said transfer means includes a substantially L-shaped transfer table having first and second transfer arms which extend in transverse relationship to one another, each arm having a workpiece clamping device mounted thereon and movable along the arm between extended and retracted positions, and means for rotating the transfer table about a substantially vertical axis back and forth through an angle which substantially equals the angle between said first and second transfer arms.

7. An apparatus according to claim 2, wherein each said nozzle includes a sleeve-like body mounted on said arm for rotation about a discharge axis, a jet member mounted within said sleeve-like body and having a chamber therein disposed in communication with a source of pressurized air, said jet member defining a jet opening at one end thereof substantially in alignment with said discharge axis for permitting discharge of an air jet therefrom, said jet opening being of an elongate slot-like configuration in cross section, and a sleeve-like nozzle member mounted within said body in coaxial alignment with and adjacent said one end of said jet member, said nozzle member having an enlarged inlet opening disposed directly adjacent and aligned with said jet opening, said inlet opening converging in cross section as it projects axially away from said jet opening, said nozzle member also having a discharge opening which opens axially inwardly from a discharge end thereof for communication with said inlet opening, said discharge opening being an elongated slot-like configuration which is generally aligned with said jet opening.

8. An apparatus according to claim 7, wherein said body and the jet member and the nozzle member mounted therein are rotatable relative to the U-shaped head about the discharge axis to vary the orientation of the discharge opening relative to the workpiece.

9. An apparatus according to claim 9, wherein the jet opening is formed by plural generally parallel rows of discreet orifices of small diameter which extend generally parallel with the discharge axis.

10. In an apparatus for deburring and cleaning a workpiece, such as an electronic device encapsulated by synthetic resin, by blasting the workpiece with a fluid stream carrying abrasive particles, said apparatus comprising:

workpiece holding means for releasably holding a workpiece therein so that the workpiece defines thereon an elongate surface to be treated;

nozzle means for ejecting a stream of abrasive particles against the surface of the workpiece;

means for effecting relative movement between the workpiece and the nozzle means in a direction generally parallel to the elongated direction of said surface so that a stream of abrasive particles is blasted against said surface throughout the length thereof during the relative movement between the nozzle means and the workpiece;

said nozzle means including a holder and a nozzle unit mounted on the holder for rotational movement about a nozzle axis which is substantially aligned with the discharge direction of the nozzle means;

said nozzle unit including a support body rotatably mounted on the holder for rotation about said nozzle axis, a jet member mounted within said support body adjacent one end thereof, and a nozzle member mounted within said support body adjacent the other end thereof, said jet member and said nozzle member being coaxially aligned and disposed concentrically with respect to said nozzle axis;

said jet member having a supply of pressurized air connected thereto for communication with an interior compartment therein, said jet member having a jet opening means formed at a discharge end thereof substantially in alignment with said nozzle axis for creating a jet-like discharge of air, said jet opening means being of an elongate configuration when viewed in cross section; and said nozzle member being of a sleeve-like construction and having an enlarged inlet opening at one end and a reduced cross-section outlet opening at the other end, said inlet and outlet openings being in coaxial alignment and communication with one another, said inlet opening having an inlet end thereof disposed substantially closely adjacent the jet opening means and coaxially aligned therewith, said inlet opening being of converging cross section as it projects axially downstream for convergence with said outlet opening, and said outlet opening being of an elongate slot-like cross sectional configuration which is oriented so as to extend generally parallel with the elongate direction of said jet opening means.

11. An apparatus according to claim 10, wherein said jet opening means is formed by a plurality of small orifices which extend axially through the discharge end of said jet member, said small orifices being oriented in spaced relationship within a plurality of generally parallel rows which extend perpendicularly with respect to said nozzle axis so as to define an elongate cross sectional configuration.

12. An apparatus according to claim 11, wherein the inlet opening of said nozzle member is of a generally conical configuration which converges as it projects axially toward the outlet opening, and wherein the outlet opening is of a generally elongated rectangular cross-sectional configuration.

13. An apparatus according to claim 10, wherein the support body has an annular channel formed therein in surrounding relationship to the jet member closely adjacent the discharge end thereof, a source of abrasive slurry being disposed in communication with said annular channel, and the discharge end of said jet member being disposed closely adjacent but slightly spaced from said one end of said nozzle member to define an annular passage therebetween through which the slurry is sucked into the inlet opening of the nozzle member.

14. An apparatus according to claim 10, wherein said jet opening means is formed by a plurality of small orifices which extend axially through the discharge end of said jet member, said small orifices being oriented in spaced relationship within an elongate row which extends perpendicularly with respect to said nozzle axis so as to define an elongate cross sectional configuration.

15. A blasting apparatus for cleaning and deburring workpieces, such as electronic devices encapsulated by synthetic resin, comprising:

housing means defining a substantially closed blasting chamber therein;

rotary drum means disposed within said blasting chamber and supported for rotation about a rotational axis;

drive means connected to said drum means for effecting rotational movement of said drum means about said rotational axis in an intermittent step-like manner so that the drum means is rotated through a plurality of angular steps during each revolution thereof;

said drum means defining therein a plurality of compartments which open radially outwardly, said plurality of compartments being circumferentially spaced around the rotational axis of said drum means and being circumferentially separated from one another by intermediate divider walls;

a plurality of workpiece holding means mounted on said drum means and positioned within said compartments, said workpiece holding means having clamping means for holding a said workpiece;

said housing means including means cooperating with said drum means when the drum means is stationary for permitting access to a respective one of the compartments to permit loading or unloading of workpieces with respect to the workpiece holding means associated with said one compartment; and a gun arrangement for deburring and cleaning workpieces mounted on said drum means within the compartments, said gun arrangement including head means mounted on said housing for reciprocating back-and-forth movement in a cyclic manner through a predetermined stroke along a direction which is parallel to said rotational axis, said gun arrangement including a plurality of nozzle assemblies mounted don said head means in circumferentially spaced relationship with one another so that each said nozzle assembly cooperates with and axially traverses forwardly and backwardly along a selected done of said compartments during each reciprocating cycle of the head means for directing a treating agent against the workpiece held within the respective compartment, each nozzle assembly including a generally U-shaped head which effectively straddles the workpiece in the respective compartment and which mounts thereon a pair of generally opposed discharge nozzles for permitting substantially simultaneous treating of opposite sides of the respective workpiece.

* * * * *

UNITED STATES PATENT AND TRADEMARK OFFICE
CERTIFICATE OF CORRECTION

PATENT NO. : 4 917 708
DATED : April 17, 1990
INVENTOR(S) : Tomio YAMAGUCHI et al It is certified that error appears in the above-identified patent and that said Letters Patent is hereby corrected as shown below:

Column 14, line 37; change "ga" to ---a---.
          line 55; change "don" to ---on---.

Column 15, line 4; change "don" to ---on---.
          line 9; change "don" to ---on---.
          line 54; change "drive" (second occurrence) to ---drum---.
          lines 63-64; change "rotation" to ---rotational---.

Column 16, line 21; change "don" to ---on---.

Column 17, line 17; change "claim 9," to ---claim 8,---.

Column 19, line 6; change "don" to ---on---.
          line 10; change "done" to ---one---

Signed and Sealed this

Fifth Day of November, 1991

Attest:

HARRY F. MANBECK, JR.

*Attesting Officer*      *Commissioner of Patents and Trademarks*